United States Patent
Kim et al.

(10) Patent No.: US 9,510,381 B2
(45) Date of Patent: Nov. 29, 2016

(54) SCHEDULING METHOD AND APPARATUS IN SYSTEM PERFORMING DEVICE-TO-DEVICE COMMUNICATION

(71) Applicants: Samsung Electronics Co., Ltd., Gyeonggi-do (KR); Research & Business Foundation Sungkyunkwan University, Gyeonggi-do (KR)

(72) Inventors: Kyung-Kyu Kim, Gyeonggi-do (KR); Min Young Chung, Seoul (KR); Dong Hyun Kim, Gyeonggi-do (KR); Sueng Jae Bae, Gyeonggi-do (KR); Dae-Gyun Kim, Gyeonggi-do (KR); Hyun-Seok Ryu, Gyeonggi-do (KR); Seung-Hoon Park, Seoul (KR); Chi-Woo Lim, Gyeonggi-do (KR)

(73) Assignees: Samsung Electronics Co., Ltd., Suwon-si (KR); Research & Business Foundation Sungkyunkwan University, Suwon-si (KR)

( * ) Notice: Subject to any disclaimer, the term of this patent is extended or adjusted under 35 U.S.C. 154(b) by 163 days.

(21) Appl. No.: 14/207,327

(22) Filed: Mar. 12, 2014

(65) Prior Publication Data
US 2014/0269387 A1 Sep. 18, 2014

(30) Foreign Application Priority Data

Mar. 12, 2013 (KR) ........................ 10-2013-0026333

(51) Int. Cl.
*G08C 15/00* (2006.01)
*H04W 76/02* (2009.01)
*H04W 74/08* (2009.01)
*H04W 8/00* (2009.01)

(52) U.S. Cl.
CPC ........... *H04W 76/023* (2013.01); *H04W 74/08* (2013.01); *H04W 8/005* (2013.01)

(58) Field of Classification Search
CPC .. H04W 76/023; H04W 74/08; H04W 8/005
USPC .................................................. 370/252, 329
See application file for complete search history.

(56) References Cited

U.S. PATENT DOCUMENTS

| | | |
|---|---|---|
| 2009/0109851 A1 | 4/2009 | Li |
| 2010/0118702 A1 | 5/2010 | Wu et al. |
| 2010/0254281 A1 | 10/2010 | Kim et al. |
| 2012/0020234 A1 | 1/2012 | Laroia et al. |
| 2012/0106475 A1 | 5/2012 | Jung |

(Continued)

OTHER PUBLICATIONS

International Search Report dated May 28, 2014 in connection with International Patent Application No. PCT/KR2014/002039, 4 pages.

(Continued)

*Primary Examiner* — Mang Yeung

(57) ABSTRACT

A link scheduling method in a system for performing Device-to-Device (D2D) communication includes periodically collecting information indicating whether to perform a medium access from at least one neighboring link determining at least one link expected to perform a medium access in a corresponding traffic slot among links with a higher priority than the terminal based on the collected information, and determining whether to perform the medium access of the terminal by considering only the at least one link expected to perform the medium access.

18 Claims, 15 Drawing Sheets

(56) References Cited

U.S. PATENT DOCUMENTS

2013/0308524 A1* 11/2013 Tavildar ............ H04W 72/1242
 370/328
2014/0140222 A1* 5/2014 Jiang ................... H04W 76/021
 370/252

OTHER PUBLICATIONS

Written Opinion of International Searching Authority dated May 28, 2014 in connection with International Patent Application No. PCT/KR2014/002039, 6 pages.

* cited by examiner

FIG.4B

| Terminal *i* | Damaged link *j* | | | | |
|---|---|---|---|---|---|
| | 1 | 2 | 3 | 4 | 5 |
| Damaging link *i*   1 | – | –1 | +1 | +1 | +1 |
| 2 | –1 | – | –1 | +1 | 0 |
| 3 | +1 | 0 | – | 0 | +1 |
| 4 | +1 | –1 | +1 | – | +1 |
| 5 | +1 | +1 | –1 | +1 | – |

FIG.6A

| LINK 1 | LINK 2 | LINK 3 | LINK 4 | LINK 5 |
|---|---|---|---|---|
|  | 1 (+1) | 1 (+1) | 1 (+1) | 1 (+1) |
|  |  | 2 (−1) | 2 (−1) | 2 (−1) |
|  |  |  | 3 (+1) | 3 (+1) |
|  |  |  |  | 4 (0) |
|  |  |  |  |  |

FIG.6B

SCHEDULING METHOD AND APPARATUS IN SYSTEM PERFORMING DEVICE-TO-DEVICE COMMUNICATION

PRIORITY

The present application is related to and claims the benefit under 35 U.S.C. §119(a) of a Korean patent application filed in the Korean Intellectual Property Office on Mar. 12, 2013 and assigned Serial No. 10-2013-0026333, the entire disclosure of which is hereby incorporated by reference.

TECHNICAL FIELD

The present disclosure relates to a system for performing Device-to-Device (D2D) communication.

BACKGROUND

A Device-to-Device (D2D) communication network implies a network in which neighboring devices directly perform communication without having to use an infrastructure consisting of a centralized access point such as a Base Station (BS) or an Access Point (AP). In the D2D communication network, a wireless terminal identifies neighboring terminals geographically adjacent to one another, and transmits data by establishing a wireless link with a specific neighboring terminal. As such, since terminals in the D2D communication network perform communication without an aid of other devices, the D2D communication network advantageously can enter a market rapidly without an additional intra structure in comparison with another wireless communication network. In addition, since the D2D communication accommodates data traffics in a localized manner, an overload problem of traffic concentrated at present in the BS or the AP can be solved. Due to such a reason, a standardization organization such as 3rd Generation Partnership Project (3GPP) and Institute of Electrical and Electronics Engineers (IEEE) promotes to establish a D2D communication standard on the basis of Long Term Evolution (LTE)-advanced or Wireless-Fidelity (WiFi). Further, an independent D2D communication technique is under development by companies such as Qualcomm, and the like.

In the D2D communication network, terminals (or devices) must be able to establish a D2D link with another terminal autonomously without an aid of the BS or the AP, and must be able to perform data communication through the D2D link. In this process, a distributed link scheduling method for determining when and which radio resource is used by each of a plurality of D2D links to transmit data is very important in regards to a performance of the D2D communication network. The Qualcomm proposes a distributed link scheduling scheme: X. Wu, S. Tabildar, S. Shakkottai, T. Richardson, J. Li, R. Laroia, and A. Jovicic. FlashLinQ: A synchronous Distributed Scheduler for Peer-to-Peer Ad Hoc Networks, Technical Report, 2010, in consideration of a Signal to Interference Ratio (SIR) between links by exchanging a single-tone discovery signal on the basis of an Orthogonal Frequency Division Multiplexing (OFDM) signal structure in a wireless environment in which terminals are synchronized.

In the FlashLinQ, a medium access status is determined when single-tone discovery signals are exchanged by a Transmit (Tx) terminal and a Receive (Rx) terminal which constitute a D2D link on the basis of a resource unit regionally given according to a Connection IDentifier (CID) of a link in Tx and Rx OFDM blocks in a link scheduling duration. In this process, each Tx terminal calculates an SIR by considering signal interference caused by the Tx terminal itself and expected to have an effect on an Rx terminal of D2D links having a higher priority, and compares the calculated SIR with a threshold. Each Rx terminal calculates an SIR on the basis of signal interference from Tx terminals having a higher priority and compares it with a threshold. In this embodiment, if the SIR calculated by the Tx terminal and the Rx terminal is greater than or equal to the threshold, the Tx and Rx terminals determine to perform data transmission by accessing a medium, and if the calculated SIR is less than the threshold, give up the medium access for links having a higher priority than the Tx and Rx terminals and determine to yield the medium access.

When the medium access status is determined as described above, although Tx/Rx terminals corresponding to a specific D2D link have given up the medium access for a different D2D link having a higher priority than the terminals themselves, there may be a case where the different D2D which is a cause of giving up the medium access actually gives up the medium access for another different D2D link having a higher priority. In this embodiment, since the different D2D link does not actually perform the medium access, an SIR condition of a specific D2D link can satisfy a threshold. However, since the Tx/Rx terminals of the specific D2D link cannot recognize a situation of giving up the medium access of a different D2D link, there may be a situation in which the specific D2D link unnecessarily gives up the medium access.

FIG. 1 illustrates a link scheduling result of a Tx terminal and an Rx terminal which constitute a D2D link according to the conventional technique. Herein, it is assumed a situation in which a first D2D link consisting of a terminal A 101 and a terminal B 102, a second D2D link consisting of a terminal C 103 and a terminal D 104, and a third D2D link consisting of a terminal D 105 and a terminal F 106 determine a medium access status through link scheduling. In addition, it is also assumed that, when a first link of the terminal A 101 and the terminal B 102 which have a highest priority performs a medium access, a second link of the terminal C 103 and the terminal D 104 which have a second priority must perform a yield, and when the second link of the terminal C 103 and the terminal D 104 which have the second priority attempts a medium access, a third link of the terminal D 105 and the terminal F 106 which have a lower priority and which are adjacent to the second link must perform a yield. In such a situation, if the three D2D links simultaneously attempt a medium access, the second link of the terminal C 103 and the terminal D 104 gives up the medium access due to the first link of the terminal A 101 and the terminal B 102 by exchanging a single-tone discovery signal in Tx and Rx OHM blocks, and the third link of the terminal E 105 and the terminal F 106 gives up the medium access due to the second link of the terminal C 103 and the terminal D 104. In this embodiment, although the third link of the terminal E 105 and the terminal F 106 can simultaneously access to a medium in practice together with the first link of the terminal A 101 and the terminal B 102, since it is not known that the second link of the terminal C 103 and the terminal C 104 gives up the medium access, a situation occurs in which the medium access is unnecessarily given up for the second link. Such a problem may result in an unnecessary yield of a plurality of links in the conventional D2D communication network, thereby deteriorating an overall network performance. Further, a medium access of links having a lower priority is unnecessarily limited, thereby deteriorating service quality (e.g., delay, data rate, and the like) of lower links. Accordingly, there is a need to provide a method for avoiding an unnecessary medium access limitation while improving an overall network performance in a D2D communication network which uses distributed link scheduling.

SUMMARY

To address the above-discussed deficiencies, it is a primary object to provide a method and apparatus for determining a yield triggering relation with respect to a medium access between Device-to-Device (D2D) links in a D2D communication network.

Another aspect of the present disclosure is to provide a method and apparatus for transmitting a signal indicating a link scheduling result in each D2D link to indicate a yield triggering relation between D2D links in a D2D communication network.

Another aspect of the present disclosure is to provide a method and apparatus for determining higher D2D links expected to perform a medium access in practice, on the basis of a yield triggering relation between D2D links in a D2D communication network.

Another aspect of the present disclosure is to provide a method and apparatus for determining a medium access or yield by considering only higher D2D links expected to perform a medium access in practice in a D2D communication network.

In accordance with an aspect of the present disclosure, a link scheduling method of a terminal in a system for performing D2D communication is provided. The method includes periodically collecting information indicating whether to perform a medium access from at least one neighboring link, determining at least one link expected to perform a medium access in a corresponding traffic slot among links with a higher priority than the terminal based on the collected information, and determining whether to perform the medium access of the terminal by considering only the at least one link expected to perform the medium access.

In accordance with another aspect of the present disclosure, a link scheduling apparatus of a terminal in a system for performing D2D communication is provided. The apparatus includes a transceiver for transmitting/receiving a signal with respect to another terminal, and a controller for periodically collecting information indicating whether to perform a medium access from of at least one neighboring link, for determining at least one link expected to perform a medium access in practice in a corresponding traffic slot among links with a higher priority than the terminal based on the collected information, and for determining whether to perform the medium access of the terminal by considering only the at least one link expected to perform the medium access.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4B illustrates a link scheduling result in a link scheduling duration according to an example embodiment of the present disclosure;

FIG. 6A and FIG. 6B illustrate an example of determining higher D2D links expected to perform a medium access in practice on the basis of a yield triggering relation between respective D2D links according to an example embodiment of the present disclosure;

DETAILED DESCRIPTION

FIGS. 2 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system and method. Those ordinarily skilled in the art may understand that the principles of the present disclosure can be implemented in any Device-to-Device (D2D) communication network properly arranged.

Hereinafter, it is assumed in the present disclosure that time and frequency synchronization is performed in advance between all terminals in a synchronization duration of a D2D communication network. In addition, an environment is assumed in which a mobility of the terminals is small and thus a yield triggering relation between neighboring links is continued more than several seconds. That is, it is assumed an environment in which, if a specific link performs a Transmit (Tx) or Receive (Rx) yield due to an influence of a neighboring link having a higher priority than the specific link itself, the Tx or Rx yield is performed when the neighboring link has a higher priority than the specific link itself also in a next traffic slot. Herein, the yield triggering relation implies a relation between two links, which indicates whether a link i having a higher priority triggers a Tx or Rx yield to a link j having a lower priority or whether the link i having the higher priority and the link j having the lower priority can simultaneously perform a Tx or Rx medium access.

In a distributed link scheduling scheme according to an example embodiment of the present disclosure, terminals establish and maintain a D2D communication network without an aid of a Base Station (BS) or an Access Point (AP) by using a limited wireless resource in a distributed manner. For this, the D2D communication network may have a periodically repeated basic transmission structure.

Figure 1:
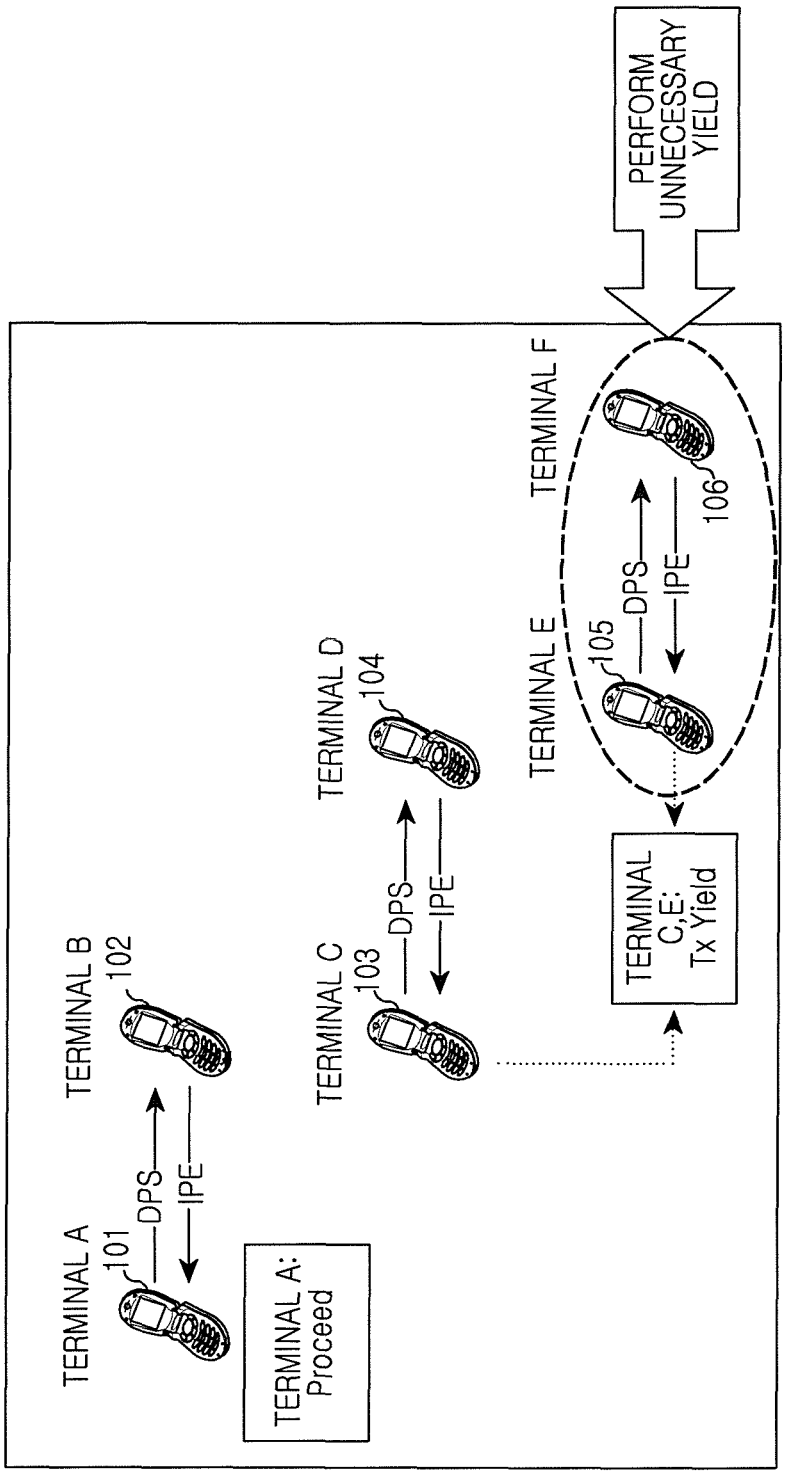
FIG. 1 illustrates a link scheduling result of a Transmit (Tx) terminal and a Receive (Rx) terminal which constitute a Device-to-Device (D2D) link according to the conventional technique.
Figure 2:
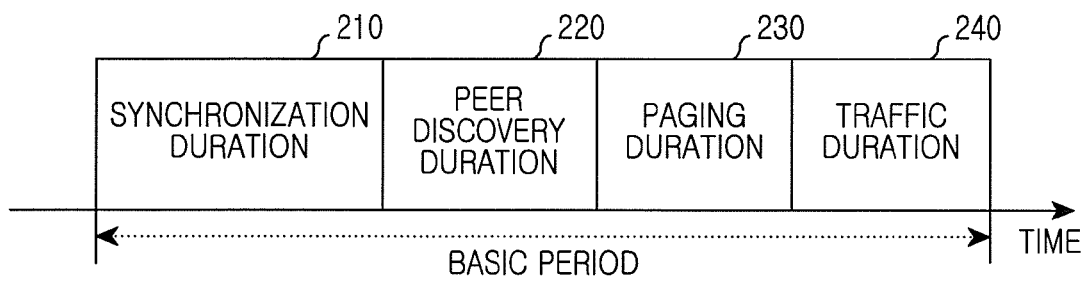
FIG. 2 illustrates a basic transmission structure according to a distributed link scheduling method to which the present disclosure is applied.

FIG. 2 illustrates a basic transmission structure according to a distributed link scheduling method to which the present disclosure is applied.

As illustrated in FIG. 2, in a D2D communication network, the basic transmission structure consists of a synchronization duration 210, a peer discovery duration 220, a paging duration 230, and a traffic duration 240. In the synchronization duration 210, a basic time and frequency synchronization between terminals is achieved by using a Global Positioning System (GPS), and the like. In the peer discovery duration 220, neighboring terminals geographically adjacent to one another are identified by using terminal information which is broadcast by each terminal. In the paging duration 230, a D2D link for unidirectional transmission is established between terminals which intend to perform communication. In the traffic duration 240, link scheduling and data transmission depending on a link scheduling result are performed on the basis of the established D2D link.

The traffic duration 240 consists of a plurality of traffic slots, and link scheduling and data transmission are performed independently for each traffic slot.

Figure 3:
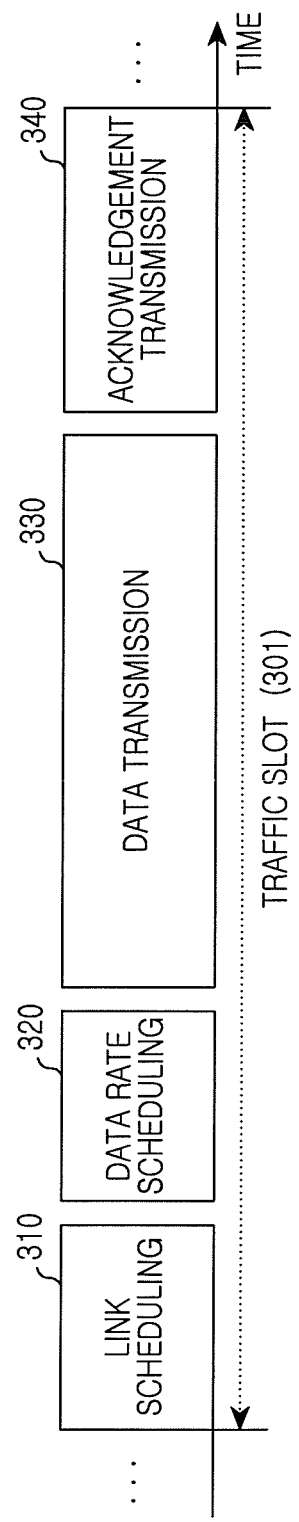
FIG. 3 illustrates a slot structure of a traffic duration of FIG. 2.

FIG. 3 illustrates a slot structure of a traffic duration of FIG. 2.

As illustrated in FIG. 2, the traffic duration 240 may consist of a plurality of traffic slots 301. The traffic slot 301 is divided into a link scheduling duration 310, a data rate scheduling duration 320, a data transmission duration 330, and an acknowledgement transmission duration 340 according to a function. In the link scheduling duration 310, by transmitting a single-tone discovery signal (hereinafter, for convenience of explanation, called a 'single-tone signal') which utilizes an OFDM signal structure per D2D link for each unidirectional communication, a signal interference relation between D2D links is measured, and a data transmission possibility status, that is, a medium access or yield status, is determined. In addition, according to an example embodiment of the present disclosure, in the link scheduling duration 310, a Tx terminal of a D2D link which determines a medium access transmits a single-tone signal indicating the medium access, such that Tx/Rx terminals of a neighboring D2D link can recognize D2D links for performing the medium access in practice in a corresponding traffic slot. In the data rate scheduling duration 320, a specific data rate is regulated for links which determine the medium access in a corresponding traffic slot. In the data transmission duration 330, Tx terminals of links which determine the medium access perform data transmission to a corresponding Rx terminal. In the acknowledgement transmission duration 340, an acknowledgement message is transmitted in response to data transmission.

In order to determine link scheduling for single-hop unidirectional D2D links in the link scheduling duration 310 of FIG. 3, that is, in order to determine a medium access status, an OFDM signal structure is defined in which radio resources orthogonal in a time and frequency domain are defined. Accordingly, a plurality of D2D terminals simultaneously transmits single-tone signals without mutual signal interference. In this process, a measured Signal to Interference Ration (SIR) is calculated for its or neighboring D2D links, and link scheduling is performed on the basis thereof.

The number of D2D links capable of using a radio resource simultaneously at a specific time is limited according to a characteristic of the radio resource. Accordingly, in a distributed link scheduling scheme, a Connection IDentifier (CID) which is an identifier assigned in a region-specific manner is assigned for each link, and by using this, a unique priority is assigned to each link for every traffic slot. On the basis of such a priority, each link determines whether to perform communication in a current traffic slot by considering SIRs for the link itself and links having a higher priority. In this embodiment, the priority is changed uniformly for every traffic slot by utilizing a Hash code, a Pseudo Noise (PN) code, and the like, to ensure fairness between links.

In order to perform link scheduling by considering SIRs of the link itself and links having a higher priority on the basis of a priority, Tx/Rx terminals constituting each link must be able to know a channel state with neighboring Tx/Rx terminals. For this, in the distributed link scheduling scheme according to the example embodiment of the present disclosure, a single-tone discovery signal transmission method based on an OFDM signal structure (or block) is defined as illustrated in FIG. 4A.

Figure 4A:
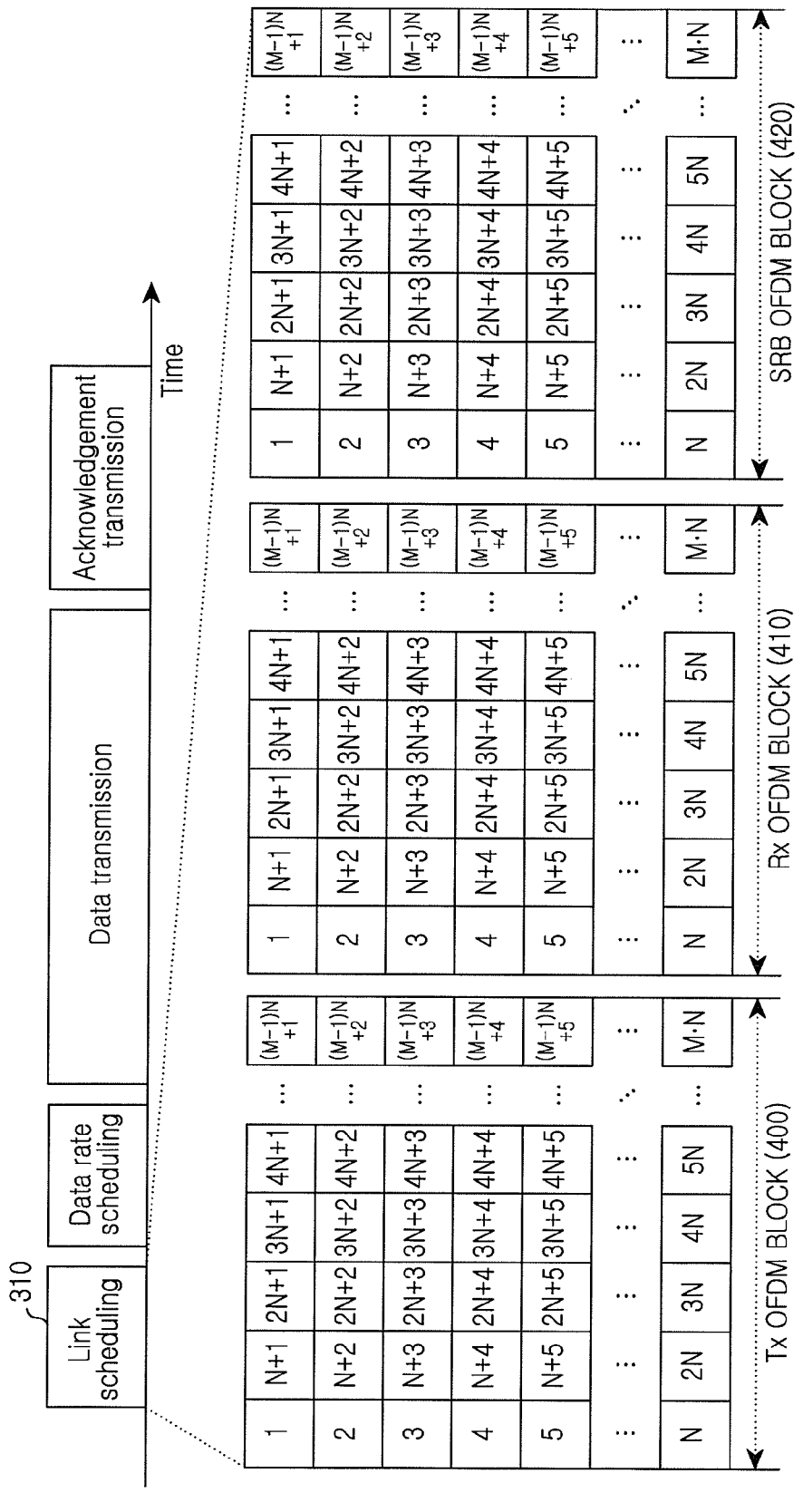
FIG. 4A illustrates a structure of a link scheduling duration of FIG. 2 according to an example embodiment of the present disclosure.

FIG. 4A illustrates a structure of a link scheduling duration of FIG. 2 according to an example embodiment of the present disclosure.

As illustrated in FIG. 4A, a link scheduling duration 310 consists of a Tx OFDM block 400 for Tx terminals and an Rx OFDM symbol 410 for Rx terminals, and further includes a Scheduling Results Broadcasting (SRB) OFDM block 420 according to the example embodiment of the present disclosure. Each OFDM symbol is N subcarriers in a frequency domain. Each OFDM symbol consists of M OFDM symbols in a time domain, and includes N·M Tx units in total. As illustrated FIG. 4A, priorities 1 to N·M are assigned to the N·M Tx units in an orderly manner from up to down and from left to right, and each link uses a resource unit corresponding to its priority to transmit/receive a single-tone discovery signal. Herein, the priority is highest when it is 1, and is lowest when it is N·M. The single-tone signal implies a tone signal having only one subcarrier in the frequency domain. In addition, the SRB OFDM block 420 located subsequently to the Rx OFDM block 410 may be inserted in every traffic slot or may be inserted in every specific slot period.

A D2D link scheduling scheme is performed as follows according to an example embodiment of the present disclosure.

First, a Tx terminal having data to be transmitted to a peer Rx terminal transmits a single-tone signal (also called a Direct Power Signal (DPS)) on the basis of a transmission unit corresponding to a link priority thereof in the Tx OFDM block 400. In this embodiment, the Rx terminal observes the transmission unit for each Tx OFDM symbol 400 of every traffic slot to receive data. When the single-tone signal is received from a peer Tx terminal, the Rx terminal first determines whether there is a table which represents a yield triggering relation between links. Herein, the table which represents the yield triggering relation indicates whether a link i having a higher priority and a link j having a lower priority can simultaneously perform a medium access. A method of creating the table representing the yield triggering relation will be described below in detail with reference to FIG. 5A to FIG. 5D. If the table representing the yield triggering relation is not present, the Rx terminal compares interference signal strength from links having a higher priority with signal strength from the peer Tx terminal and determines a communication possibility status of a corresponding link. Otherwise, in the presence of the table representing the yield triggering relation, on the basis of the table presenting the yield triggering relation, the Rx terminal determines links expected to perform the medium access in practice in a current traffic slot among links having a higher priority, and thereafter determines a communication possibility status of a corresponding link by using an interference signal strength from the links expected to perform the medium access in practice and a signal strength from the peer Tx terminal. If it is determined that communication to the corresponding link is possible, the Rx terminal transmits a single-tone signal (also called an Inverse Power Echo (IPE)) on the basis of a transmission unit corresponding to the Rx OFDM block 410, and if it is determined that communication to the corresponding link is not possible, the Rx terminal does not transmit the single-tone signal on the basis of the transmission unit corresponding to the Rx OFDM block 410.

Figure 4B:
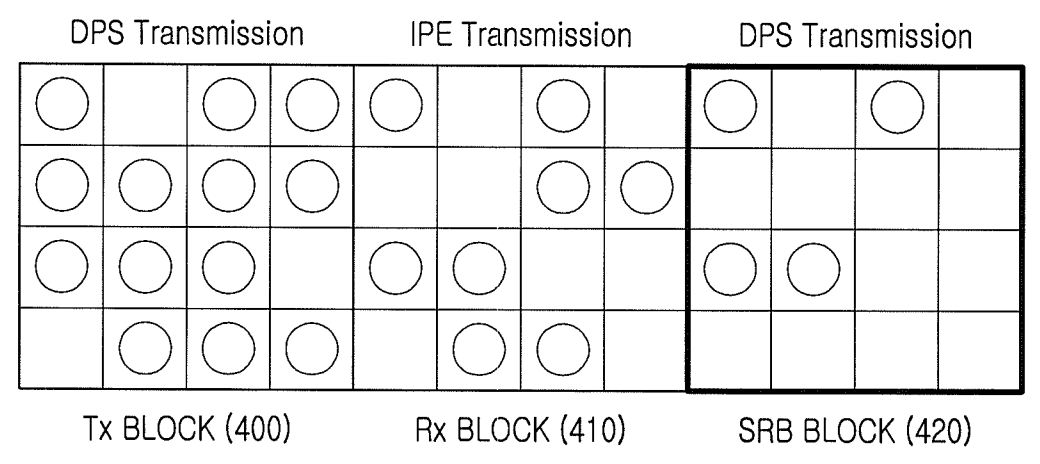

Likewise, the Tx terminal observes a corresponding transmission unit for each Rx OFDM block 410 of every traffic slot. Upon receiving a single-tone signal from the peer Rx terminal, the Tx terminal determines whether there is a table which represents a yield triggering relation between links. If the table representing the yield triggering relation does not exist, the Tx terminal compares an interference signal strength caused by the Tx terminal itself and expected to have an effect on an Rx terminal of links having a higher priority and a signal strength from a peer Rx terminal, and thus determines a communication possibility status of a corresponding link. Otherwise, if the table indicating the yield triggering relation exists, on the basis of the table representing the yield triggering relation, the Tx terminal determines links expected to perform a medium access in practice in a current traffic slot among links having a higher priority, and thereafter determines a communication possibility status of a corresponding link by using the interference signal from the links expected to perform the medium access in practice among the links having the higher priority and a signal strength from the peer Rx terminal. If it is determined that communication to the corresponding link is possible, the Tx terminal transmits a single-tone signal on the basis of a corresponding transmission unit in the SRB OFDM block 420 according to the example embodiment of the present disclosure, and if it is determined that communication to the corresponding link is impossible, the single-tone signal is not transmitted on the basis of the corresponding transmission unit in the SRB OFDM block 420. In this embodiment, the remaining Tx and Rx terminals other than the Tx terminal which transmits the single-tone signal in the SRB OFDM block 420 observe the SRB OFDM block 420, determine the yield triggering relation between respective links, and create or update the table representing the determined yield triggering relation. For example, in the example embodiment of the present disclosure, as illustrated in FIG. 4B, a Tx terminal of a link determined to perform a medium access in practice on the basis of the single-tone signal transmitted/received via the Tx OFDM block 400 and the Rx OFDM block 410 is allowed to transmit a single-tone signal having the same signal strength as a DPS by using a resource unit corresponding to its priority in the SRB OFDM block 420, thereby being able to report a distributed link scheduling result to Tx/Rx terminals of other neighboring links. In this embodiment, the remaining Tx terminals other than the Tx terminal of the link determined to perform the medium access in practice and all Rx terminals listen the SRB OFDM block 420, and thus determine a detection status of a single-tone signal having a reception strength greater than or equal to a threshold for each resource unit. If the single-tone signal having the reception strength greater than or equal to the threshold is detected in a specific resource unit, a terminal which detects the signal confirms whether the specific resource unit is used by a D2D link having a certain CID. Herein, whether the D2D link having the certain CID is used for the specific resource unit may be determined by using an inverse function of a hash function which converts a CID into a priority. Each terminal which listens the SRB OFDM block 420 may determine a link which performs the medium access in practice and a link which cannot perform the medium access in every traffic slot.

FIG. 5A to FIG. 5D illustrate an example of creating a table representing a yield triggering relation between D2D links according to an example embodiment of the present disclosure. Herein, a case of creating the table representing the yield triggering relation between consecutive 4 traffic slots is described for example. In addition, for convenience of explanation, a case where 4 D2D links attempt a medium access is assumed in description. In this embodiment, it is assumed a situation in which a priority of each D2D link changes in every traffic slot.

If a damaging link i having a higher priority performs the medium access, the yield triggering relation table according to the example embodiment of the present disclosure indicates whether a damaged link j having a relatively lower priority can access to a medium simultaneously with the damaging link i. Therefore, in FIG. 5A to FIG. D described hereinafter, if it is determined that the damaging link i and the damaged link j can simultaneously perform the medium access, a relation between the damaging link i and the damaged link j is recorded as '+1', and if it is determined that the damaged link j does not perform the medium access when the damaging link j performs the medium access, the relation between the damaging link i and the damaged link j is recorded as '−1'. In addition, if a medium access relation between the damaging link i and the damaged link j is not recognized until a current time, the relation between the damaging link i and the damaged link j can be recorded as '0'.

Figure 5A:
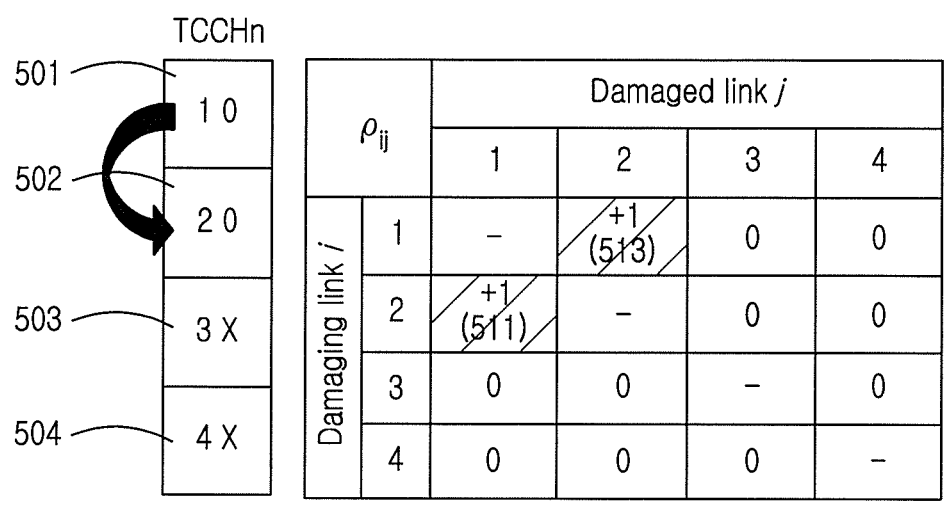
FIG. 5A to FIG. 5D illustrate an example of creating a table representing a yield triggering relation between D2D links according to an example embodiment of the present disclosure.

Referring to FIG. 5A, in an $n^{th}$ traffic slot, a first link 501 has a highest priority, and a second link 502, a third link 503, and a fourth link 504 gradually have lower priorities, in that order. As illustrated, if a Tx terminal of the first link 501 and a Tx terminal of the second link 502 transmit a single-tone signal in an SRB OFDM block, other terminals which listen the SRB OFDM block of the $n^{th}$ traffic slot determine that the first link 501 and the second link 502 can simultaneously perform the medium access. Therefore, the other terminals record '+1' 513 as a relation of a case where a damaging link is a first link and a damaged link is a second link, and record '+1' 511 as a relation of a case where the damaging link is the second link and the damaged link is the first link. In this embodiment, although the third link 503 and the fourth link 504 do not transmit a single-tone signal in the SRB OFDM block, since the third link 503 and the fourth link 504 cannot know a specific link by which the medium access is given up between the first link 501 having a higher priority and the second link 502, '0' is recorded as a relation of the remaining links.

Figure 5B:
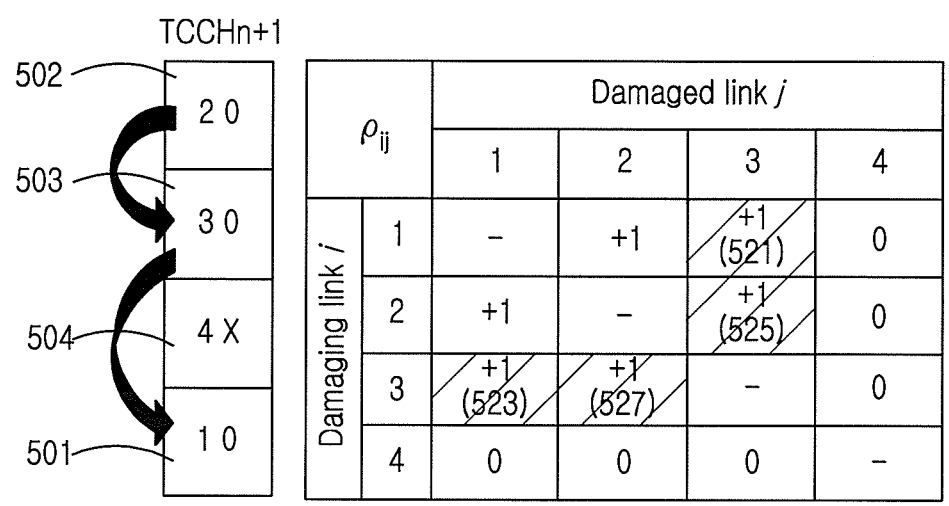

Referring to FIG. 5B, in an $(n+1)^{th}$ traffic slot, the second link 502 has a highest priority, and the third link 503, the fourth link 504, and second link 502 gradually have lower priorities, in that order. As illustrated, if a Tx terminal of the second link 502, a Tx terminal of the third link 503, and a Tx terminal of the first link 501 transmit a single-tone signal in an SRB OFDM block, other terminals which listen the SRB OFDM block of the $(n+1)^{th}$ traffic slot determine that the second link 502 and the third link 503 can simultaneously perform the medium access, and the third link 503 and the first link 501 can simultaneously perform the medium access. Therefore, the other terminals record '+1' 525 as a relation of a case where a damaging link is the second link and a damaged link is the third link, and record '+1' 527 as a relation of a case where the damaging link is the third link and the damaged link is the second link. In addition, the other terminals record '+1' 523 as a relation of a case where the damaging link is the third link and the damaged link is the first link, and record '+1' 521 as a relation of a case where the damaging link is the first link and the damaged link is the third link. In this embodiment, although the fourth link 504 does not transmit a single-tone signal in the SRB OFDM block, since the fourth link 504 cannot know a specific link by which the medium access is given up between the second link 502 having a higher priority and the third link 503, a relation between the fourth link 504 and the other links 501, 502, and 503 maintains a value recorded in the $n^{th}$ traffic slot.

Figure 5C:
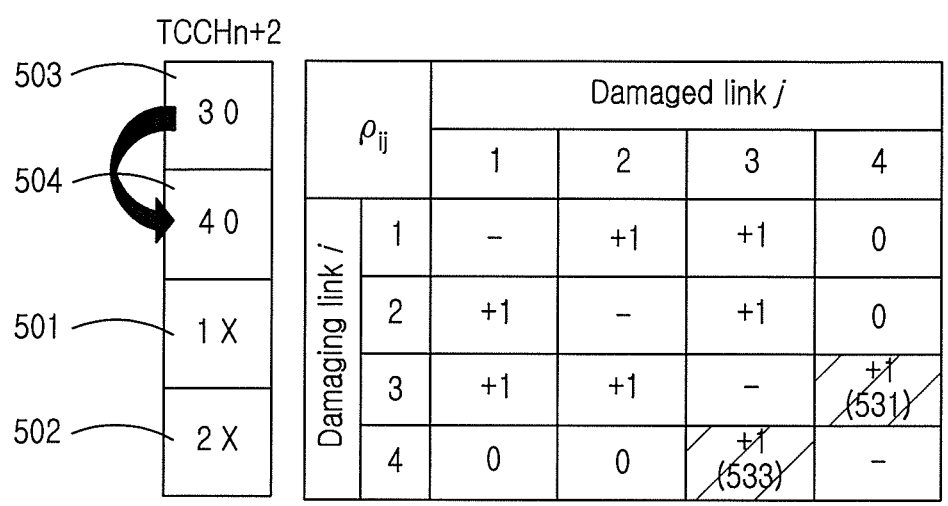

Referring to FIG. 5C, in an $(n+2)^{th}$ traffic slot, the third link 503 has a highest priority, and the fourth link 504, the third link 503, and second link 502 gradually have lower priorities, in that order. As illustrated, if a Tx terminal of the third link 503 and a Tx terminal of the fourth link 504 transmit a single-tone signal in an SRB OFDM block, other terminals which listen the SRB OFDM block of the $(n+2)^{th}$ traffic slot determine that the third link 503 and the fourth link 504 can simultaneously perform the medium access. Therefore, the other terminals record '+1' 531 as a relation of a case where a damaging link is the third link and a damaged link is the fourth link, and record '+1' 533 as a relation of a case where the damaging link is the fourth link and the damaged link is the fourth link. In this embodiment, although the first link 501 and the second link 502 do not transmit a single-tone signal in the SRB OFDM block, since each of the first link 501 and the second link 502 cannot know a specific link by which the medium access is given up between the third link 503 having a higher priority and the fourth link 504, a relation between the third and fourth links 503 and 504 and the other links 501 and 502 maintains a value recorded in the $n^{th}$ traffic slot and the $(n+1)^{th}$ traffic slot.

Figure 5D:
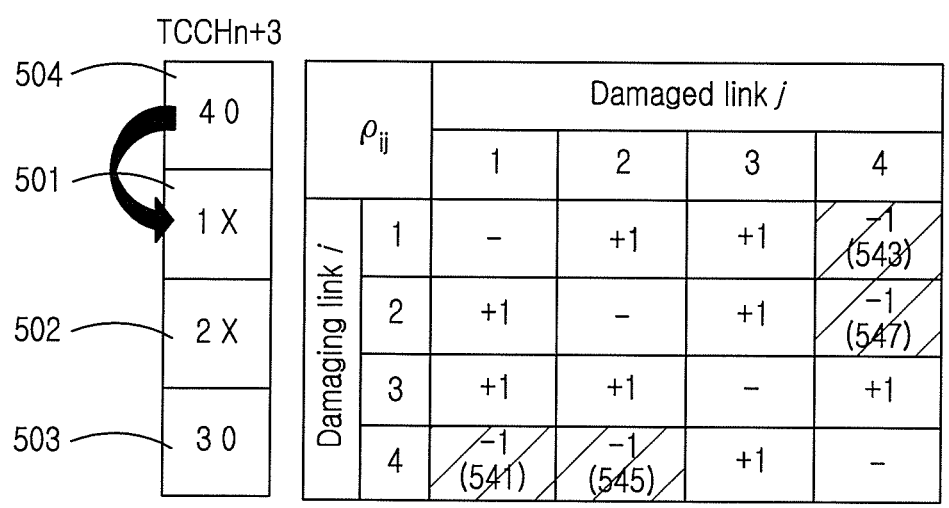

Referring to FIG. 5D, in an $(n+3)^{th}$ traffic slot, the fourth link 504 has a highest priority, and the first link 501, the second link 502, and the third link 503 gradually have lower priorities, in that order. As illustrated, if a Tx terminal of the fourth link 504 and a Tx terminal of the third link 503 transmit a single-tone signal in an SRB OFDM block, other terminals which listen the SRB OFDM block of the $(n+3)^{th}$ traffic slot determine that the third link 503 and the fourth link 504 can simultaneously perform the medium access. Therefore, the other terminals record 'n+1' 531 as a relation of a case where a damaging link is the third link and a damaged link is the fourth link, and record '+1' 533 as a relation of a case where the damaging link is the fourth link and the damaged link is the fourth link. In this embodiment, since the relations 531 and 533 of the third link 503 and the fourth link 504 are equal to values pre-recorded in the $(n+1)^{th}$ slot, a corresponding value can be maintained. However, according to another example embodiment, if a relation of the third link 503 and the fourth link 504 is different from a relation value pre-recorded in the $(n+2)^{th}$ slot, the other terminals may update a relation value of the third link 503 and the fourth link 504 to a value recognized in a current traffic slot. In addition, the first link 501 and the second link 502 do not transmit a single-tone signal in an SRB OFDM block, and since only the fourth link 504, which has a highest priority among links having a higher priority than the first link 501 and the second link 502, transmits a single-tone signal in an SRB OFDM block, the other terminals may determine that the first link 501 and the second link 502 give up an access medium by the fourth link 504. Therefore, the other links record '−1' 541 as a relation of case where a damaging link is the fourth link and a damaged link is the first link, and records '−1' 543 as a relation of a case where the damaging link is the second link and the damaged link is the fourth link. In addition, the other terminals record '−1' 545 as a relation of case where the damaging link is the fourth link and the damaged link is the second link, and record '−1' 547 as a relation of a case where the damaging link is the second link and the damaged link is the fourth link.

In the example embodiment of the present disclosure, as illustrated in FIG. 5A to FIG. 5D, a link scheduling operation described below is performed on the basis of a created yield triggering relation table.

That is, an Rx (or Tx) terminal which receives a Tx (or Rx) OFDM block confirms all links having a higher priority than its link, selects only links expected to perform a medium access in practice among the all links having the higher priority on the basis of a yield triggering relation table created before a current traffic slot, and thereafter determines an Rx (or Tx) yield status by considering only a single-tone signal (DPS or IPE) for the selected links.

For example, as illustrated in FIG. 6A, if a yield triggering relation table is formed between a damaging link i and a damaged link j, as illustrated in FIG. 6B, terminals constituting each link may determine its Tx (or Rx) yield status by considering only an interference of links expected to perform a medium access in practice on the basis of a yield triggering relation of links having a higher priority than the terminals themselves.

In an embodiment, in FIG. 6B, since the first link has a highest priority, it is determined to perform the medium access without considering another link in a corresponding traffic slot.

In addition, the second link considers a relation with the first link having a higher priority than the second link itself, and since the relation with the first link is '−1', it is determined to give up the medium access, that is, to perform a Tx or Rx yield, in a corresponding traffic slot.

In addition, the third link determines a Tx or Rx yield status by considering a relation of the first and second links having a higher priority than the third link itself. The third link must give up the medium access when the third link accesses a medium of the second link on the basis of the yield triggering relation table. However, in practice, the third link confirms that the second link gives up the medium access by the first link, and determines a Tx or Rx yield status in a corresponding traffic slot by considering only an interference from the first link except for an interference from the second link.

In addition, the fourth link determines a Tx or Rx yield status by considering a relation of the first to third links having a higher priority than the fourth link itself. The fourth link predicts that the first link and the third link perform the medium access and that the second link gives up the medium access. Thus, the fourth link determines a Tx or Rx yield status in a corresponding slot by considering only an interference from the first link and the third link except for an interference from the second link.

In addition, the fifth link determines a Tx or Rx yield status by considering a relation of the first to fourth links having a higher priority than the fifth link itself. In this embodiment, the fifth link may predict that the first link and the third link perform a medium access from a yield triggering relation table and that the second link gives up the medium access, and may determine that a relation of the third link and the fourth link is not recognized. Accordingly, the fifth link determines a Tx or Rx yield status in a corresponding traffic slot by considering only an interference from the first link, the third link, and the fourth link except for an interference from the second link.

In this embodiment, in order to determine an Rx yield status, the Rx terminal calculates an SIR of its link by considering only a signal interference strength from a high priority link expected to perform the medium access, and compares the calculated SIR with an Rx yield threshold. If the calculated SIR is greater than or equal to the Rx yield threshold, the Rx terminal determines the medium access, and if the SIR is less than the Rx threshold, the Rx terminal determines an Rx yield. In addition, in order to determine a Tx yield status, the Tx terminal calculates an SIR by considering an interference amount which is caused by the Tx terminal and expected to have an effect on links expected to perform the medium access, and compares the calculated SIR with a Tx threshold. If the calculated SIR is greater than or equal to a Tx yield threshold, the Tx terminal determines the medium access, and if the SIR is less than the Tx threshold, the Tx terminal determines a Tx yield. In the present disclosure, the Rx yield status and the Tx yield status may be determined by using an SIR calculation equation disclosed in "FlashLinQ: a Synchronous distributed scheduler for peer-to-peer ad hoc networks".

In the example embodiment of the present disclosure described above, when terminals of the third, fourth, and fifth links determine Tx and Rx yield status, an influence of the second link expected not to perform the medium access by the first link is not considered. Accordingly, Tx and Rx yields of another link can be prevented from occurring unnecessarily caused by the second link.

Figure 7:
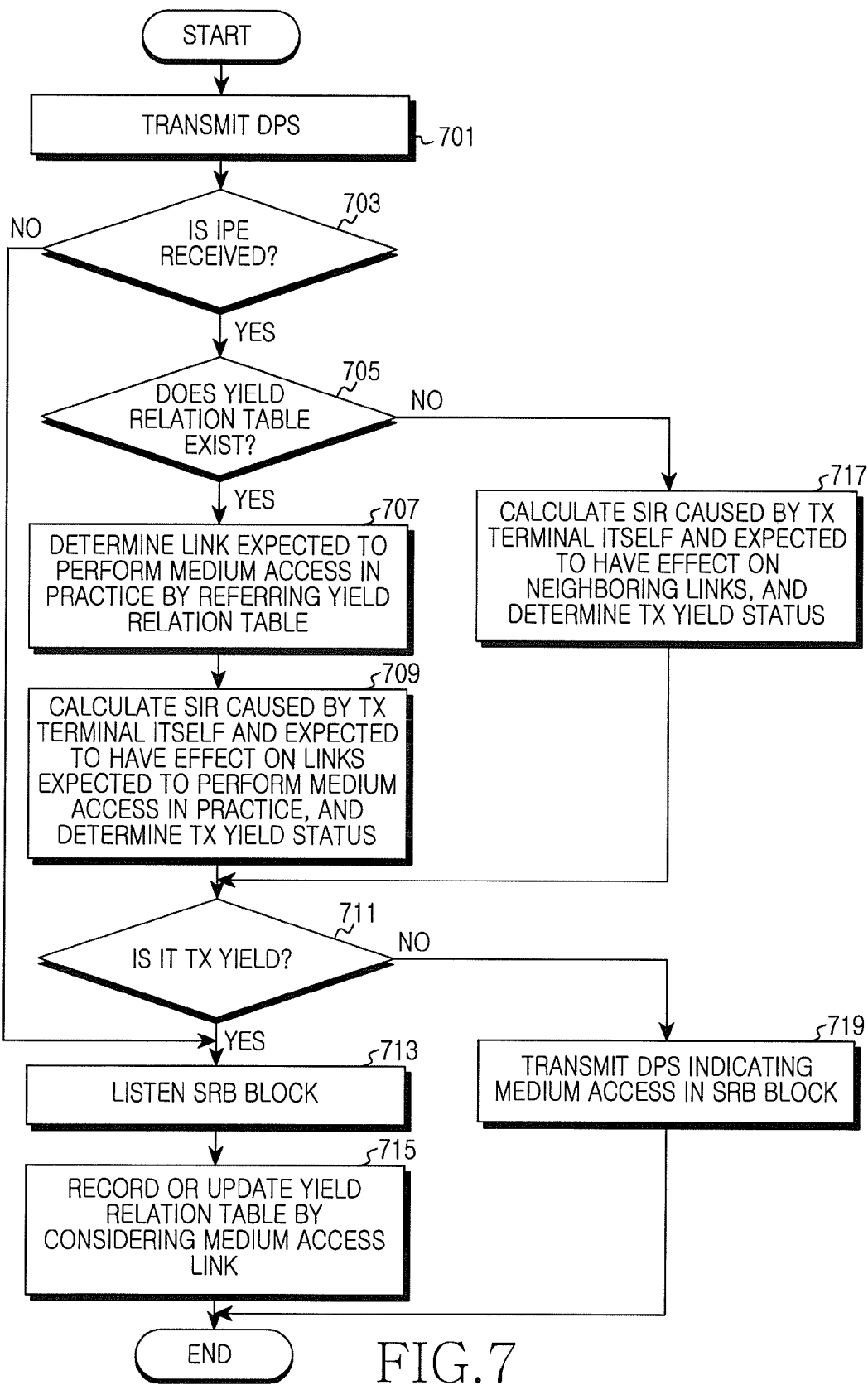
FIG. 7 illustrates a process of operating a Tx terminal of a D2D link according to an example embodiment of the present disclosure.

FIG. 7 illustrates a process of operating a Tx terminal of a D2D link according to an example embodiment of the present disclosure.

Referring to FIG. 7, in order to attempt a medium access, in operation 701, the Tx terminal transmits a DPS signal which is a single-tone signal to a corresponding Rx terminal via the Tx OFDM block 400. In operation 703, the Tx terminal monitors the Rx OFDM block 401, and determines whether an IPE signal which is a single-tone signal is received from the corresponding Rx terminal. In this embodiment, as a result of monitoring the Rx OFDM block 410, the Tx terminal may receive an IPE signal which acts as an interference signal from an Rx terminal of an adjacent link.

If the IPE signal is not received, the Tx terminal determines that Rx terminal performs an Rx yield, and proceeds to operation 713 by determining to give up a medium access.

Otherwise, if the IPE signal is received, in operation 705, the Tx terminal determines whether there is a table representing a yield triggering relation between respective links (hereinafter, called a 'yield relation table'). That is, the Tx terminal examines whether the yield relation table is created and updated before a current traffic slot. If the yield relation table does not exist, proceeding to operation 717, the Tx terminal calculates an SIR by considering a signal interference caused by the Tx terminal itself and expected to have an effect on neighboring links, and determines a Tx yield status on the basis of the calculated SIR. In this embodiment, the neighboring links imply links having a higher priority than a link of the Tx terminal among links by which an IPE signal is received to the Tx terminal via an Rx OFDM block 410 of a current traffic slot.

Otherwise, if the yield relation table exists, in operation 707, the Tx terminal determines links expected to perform a medium access in practice among links having a higher priority than the Tx terminal itself by referring the yield relation table. In operation 709, the Tx terminal may calculate an SIR by considering a signal interference caused by the Tx terminal itself and expected to have an effect on the links expected to perform the medium access in practice, and may determine a Tx yield status on the basis of the calculated SIR. That is, the Tx terminal may select only the links expected to perform the medium access in practice except for links expected not to perform the medium access in practice among the links having the higher priority than the Tx terminal itself. Thereafter, the Tx terminal may calculate an SIR of links selected on the basis of a signal interference expected to have an effect on links selected by the Tx terminal itself, and may determine a Tx yield status by comparing the calculated SIR with a pre-set Tx threshold. In this embodiment, if the calculated SIR is greater than or equal to a pre-set Tx threshold, the Tx terminal decides that the SIR of the selected links can be ensured even if the Tx terminal itself performs the medium access, and then determines the medium access. Otherwise, if the calculated SIR is less than the pre-set Tx threshold, the Tx terminal decides that the SIR of the selected links cannot be ensured when the Tx terminal itself performs the medium access.

In operation 711, the Tx terminal confirms a result of determining a Tx yield status. As a result of determining the Tx yield status, if it is determined to perform the medium access while not performing a Tx yield, proceeding to operation 719, the Tx terminal transmits a DPS signal which is a single-tone signal indicating the medium access in an SRB block, and ends the procedure of FIG. 7. In this embodiment, the Rx terminal may regulate a specific data rate in the data rate scheduling duration 320 of the current traffic duration, may transmit data to the peer Rx terminal in the data transmission duration 330, and may receive an acknowledge message to the peer Rx terminal in the acknowledge transmission duration 340. Thereafter if a next traffic slot duration arrives, returning to operation 701, the subsequent operations may be repeated.

If it is determined to perform the Tx yield according to the result of determining the Tx yield, proceeding to operation 713, the Tx terminal listens an SRB block. In this embodiment, the Tx terminal may confirm links for performing the medium access in a current traffic slot on the basis of a DPS received by listening the SRB block. In operation 715, the Tx terminal records or updates the yield relation table by considering the links for performing the medium access in the current traffic slot, and ends the procedure of FIG. 7. In this embodiment, the Tx terminal may not perform signal transmission/reception in the data rate scheduling duration 320, data transmission duration 330, and acknowledge transmission duration 340 of a current traffic duration. Instead, the Rx terminal may wait until a next traffic slot arrives, and thereafter returning to operation 701, the subsequent operations may be repeated.

Figure 8:
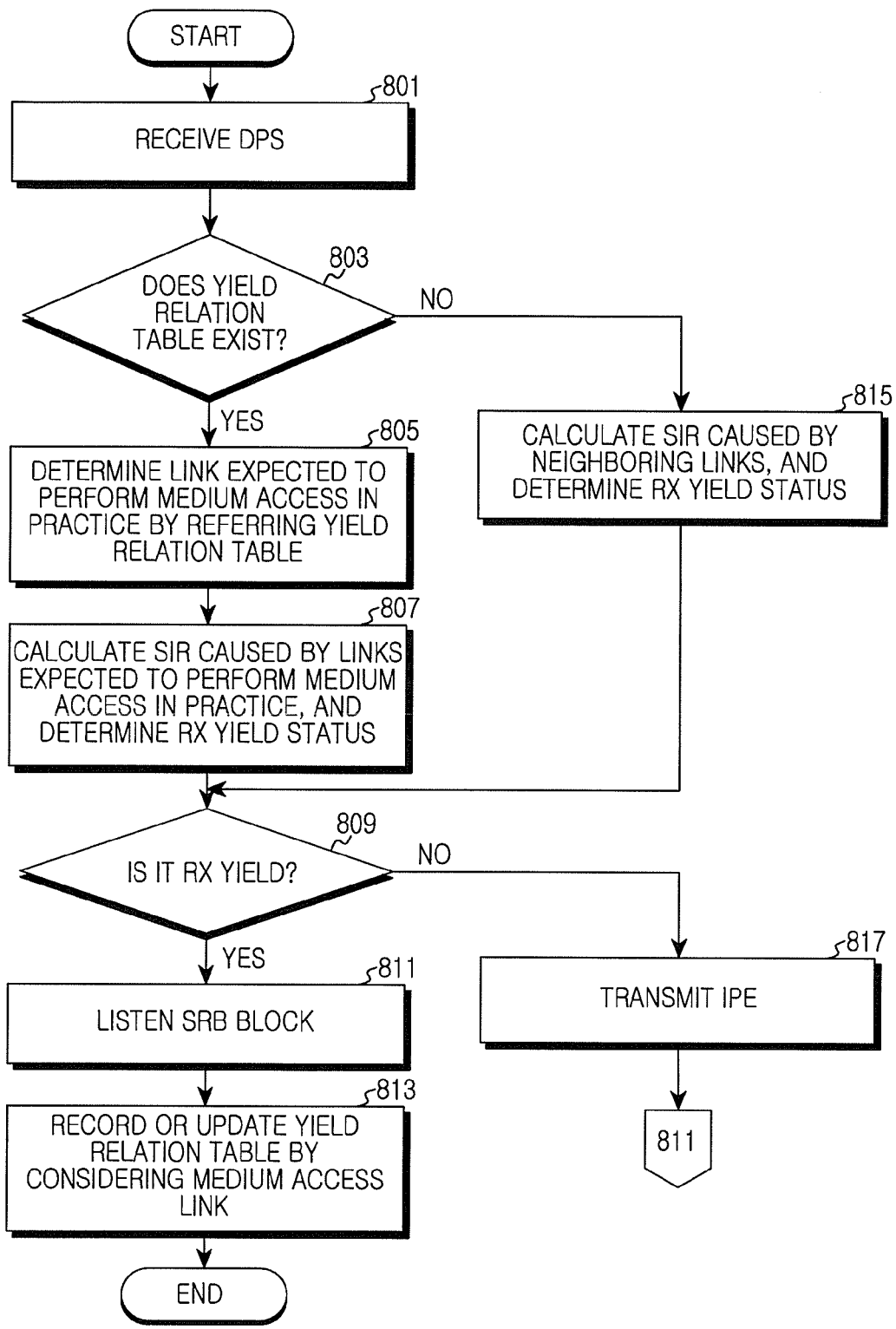
FIG. 8 illustrates a process of operating an Rx terminal of a D2D link according to an example embodiment of the present disclosure.

FIG. 8 illustrates a process of operating an Rx terminal of a D2D link according to an example embodiment of the present disclosure.

Referring to FIG. 8, in order to attempt a medium access, in operation 801, the Rx terminal receives a DPS signal which is a single-tone signal by monitoring the Tx OFDM block 400 from a Tx terminal. In operation 803, the Rx terminal determines whether there is a table representing a yield triggering relation between respective links (hereinafter, such a table is called a 'yield relation table'). That is, the Rx terminal examines whether the yield relation table is created and updated before a current traffic slot. If the yield relation table does not exist, proceeding to operation 815, the Rx terminal calculates an SIR on the basis of a signal interference from neighboring links, and determines an Rx yield status. In this embodiment, the neighboring links imply links having a higher priority than a link of the Rx terminal among links by which a DPS signal is received to the Rx terminal via the Tx OFDM block 400 of a current traffic slot.

Otherwise, if the yield relation table exists, in operation 805, the Rx terminal determines links expected to perform a medium access in practice among links having a higher priority than the Rx terminal itself by referring the yield relation table. In operation 807, the Rx terminal may calculate an SIR on the basis of a signal interference from the links expected to perform the medium access in practice and thus may determine an Rx yield status. That is, the Rx terminal may select only the links expected to perform the medium access in practice except for links expected not to perform the medium access in practice among the links having the higher priority than the Rx terminal itself. Thereafter, the Rx terminal may calculate its SIR by considering a signal interference from the selected links, and may determine an Rx yield status by comparing the calculated SIR with a pre-set Rx threshold. In this embodiment, if the calculated SIR is greater than or equal to a pre-set Rx threshold, it is determined that the medium access is possible. Otherwise, if the calculated SIR is less than a pre-set Rx threshold, the Rx yield is determined.

In operation 809, the Rx terminal determines a result of determining the Rx yield status. If it is determined to perform the medium access without having to perform the Rx yield according to the result of determining the Rx yield status, proceeding to operation 817, the Rx terminal transmits an IPE signal which is a single-tone signal via the Rx OFDM block 410, and the procedure proceeds to operation 811.

Otherwise, if it is determined to perform the Rx yield according to the result of determining the Rx yield, directly proceeding to operation 811, the Rx terminal listens an SRB block. In this embodiment, the Rx terminal may confirm links for performing the medium access in a current traffic slot on the basis of a DPS received by listening the SRB block. In operation 813, the Rx terminal records or updates the yield relation table by considering the links for performing the medium access in the current traffic slot, and ends the procedure of FIG. 8. In this embodiment, if a peer Tx terminal of the Rx terminal transmits a DPS signal in an SRB block, the Rx terminal may regulate a specific data rate in the data rate scheduling duration 320 of the current traffic duration, may receive data from the peer Tx terminal in the data transmission duration 330, and may transmit an acknowledge message to the peer Tx terminal in the acknowledge transmission duration 340. Thereafter, if a next traffic slot duration arrives, returning to operation 801, the subsequent operations may be repeated. Otherwise, if the peer Tx terminal of the Rx terminal does not transmit the DPS signal in the SRB block, the Rx terminal may not perform signal transmission/reception in the data rate scheduling duration 320, data transmission duration 330, and acknowledge transmission duration 340 of a current traffic duration. Instead, the Rx terminal may wait until a next traffic slot arrives, and thereafter returning to operation 801, the subsequent operations may be repeated.

Figure 9:
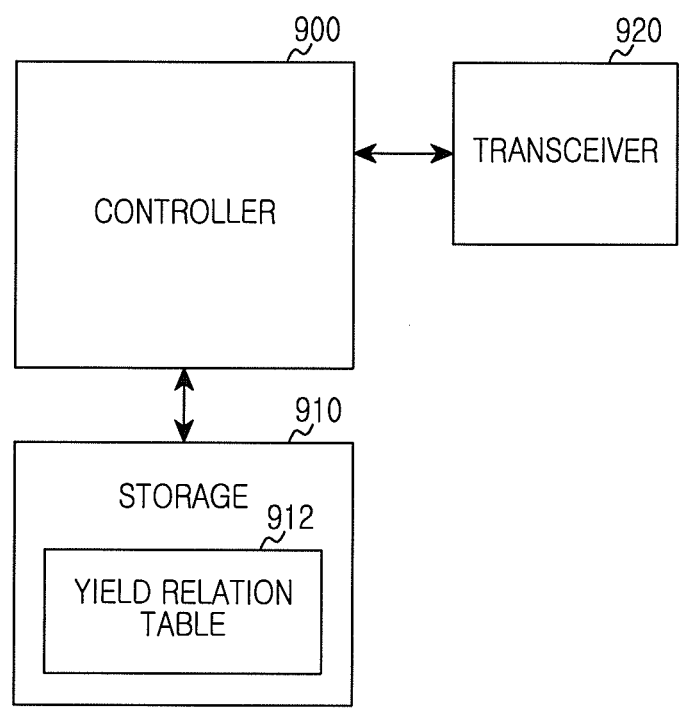
FIG. 9 illustrates a block diagram of a terminal according to an example embodiment of the present disclosure.

FIG. 9 illustrates a block diagram of a terminal according to an example embodiment of the present disclosure.

Referring to FIG. 9, the terminal includes a controller 900, storage 910, and a transceiver 920.

The controller 900 controls and processes an overall operation of the terminal, and controls and processes an operation for performing distributed link scheduling for D2D communication according to the example embodiment of the present disclosure. In an embodiment, the controller 900 listens the SRB OFDM block 420 located after the Tx OFDM block 400 and the Rx OFDM block 410 in the link scheduling duration 310 for every traffic slot or for each specific period and receives a single-tone signal from neighboring terminals, thereby controlling and processing a function for creating and updating a yield relation table 912 representing a yield triggering relation between neighboring links. In this embodiment, the table representing the yield triggering relation may be created and updated as illustrated in FIG. 5A to FIG. 5D. In addition, when the medium access is attempted, the controller 900 confirms D2D links expected to perform the medium access in practice in a corresponding traffic slot on the basis of the table representing the yield triggering relation, calculates an SNR by considering only the D2D links expected to perform the medium access in practice among links having a higher priority, and determines whether to perform the medium access or to give up the medium access on the basis of the calculated SIR. In addition, if the medium access is determined and if the terminal is a Tx terminal, in order to announce to neighboring links that the terminal intends to perform the medium access in the corresponding traffic slot, the controller 900 controls and processes a function for transmitting a single-tone signal in the SRB OFDM block 420 in the link scheduling duration 310.

The storage 910 stores a variety of programs and data used for an operation of the terminal. In an embodiment, the storage 910 stores the yield relation table 912 according to the present disclosure. The yield relation table is a table representing a yield triggering relation between neighboring links, and indicates whether a link i having a higher priority triggers a Tx or Rx yield to a link j having a lower priority or whether the link i having the higher priority and the link j having the lower priority can simultaneously perform a Tx or Rx medium access. In addition, the yield relation table may indicate a relation between the link i having the higher priority and the link j having the lower priority is not recognized.

For D2D communication, the transceiver 920 performs a function for transmitting/receiving a signal with respect to a peer terminal under the control of the controller 900. The transceiver 920 performs a function for transmitting or receiving a single-tone signal in the Rx OFDM block 400 or the Tx OFDM block 410 in the link scheduling duration 310 under the control of the controller 900. In an embodiment, the transceiver 920 may transmit the single-tone signal on the basis of a transmission unit corresponding to a priority of the terminal in the SRB OFDM block 420 in the link scheduling duration 310 under the control of the controller 900, or may listen the SRB OFDM block 420 and receive the single-tone signal transmitted from Tx terminals of a neighboring link.

Figure 10:
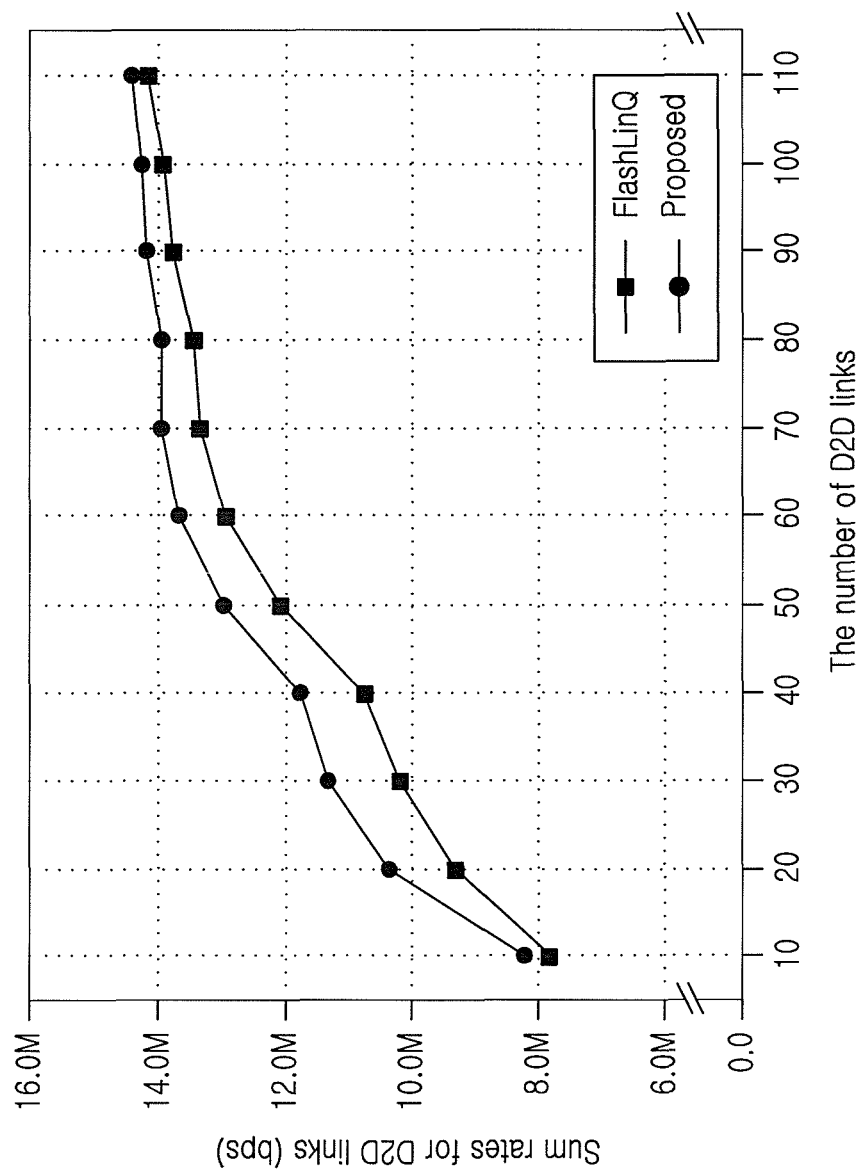
FIG. 10 illustrates a performance graph of a D2D communication network according to the present disclosure and the conventional technique.

FIG. 10 illustrates a performance graph of a D2D communication network according to the present disclosure and the conventional technique. The performance illustrated herein is in regards to the conventional technique for determining a medium access by considering all links having a higher priority and a case in which the medium access is determined by considering only links expected to perform the medium access in practice among links having a higher priority according to an example embodiment of the present disclosure. Herein, a horizontal axis indicates the number of all links, and a vertical axis indicates a total network throughput (bps).

In this performance estimation, a 1 Km×Km square-type network region is premised in a network configuration. It is premised that a carrier frequency is 2.4 GHz, an overall bandwidth is 5 MHz, a length of a traffic slot is 2 msec, and a size of a Tx/Rx OFDM block is 28 OFDM tones×4 OFDM symbols. In addition, a path loss model is ITU-R P1411 Outdoor, a Tx threshold and an Rx threshold which are criteria of determining a Tx yield and an Rx yield use 9 dB, the maximum number of CDs is 112, a Tx power of a terminal is 20 dBm, a noise power spectral density is −174 dBm/Hz, an antenna gain of the terminal is −2.5 dBi, an antenna length of the terminal is 1.5 m, and an antenna type is an omni-directional antenna.

Example embodiments of the present disclosure may determine a yield triggering relation for a medium access between respective D2D links on the basis of a signal representing a link scheduling result in a D2D communication network, may determine higher D2D links expected to perform the medium access in practice on the basis of the yield triggering relation between the respective D2D links, and may determine a medium access or yield by considering only the determined D2D links. Therefore, the medium access of links having a lower priority can be prevented from being unnecessarily limited, and thus an overall network performance can be improved.

While the present disclosure has been particularly shown and described with reference to example embodiments thereof, it will be understood by those skilled in the art that various modifications and changes in form and details may be made therein without departing from the spirit of the disclosure. A program instruction for performing an operation implemented with various computers may be recorded in a computer readable recording medium according to an example embodiment of the present disclosure. The computer readable recording medium may include a program instruction, a data file, a data structure, and the like, in an independent or combined manner. The program instruction may be designed and configured in an embodiment for the present disclosure, or may be known and usable to those ordinarily skilled in the art. The computer readable recording medium may be a hardware device configured, in an embodiment, to store and perform a program instruction, for example, a hard disk, a magnetic medium such as a floppy disc and a magnetic tape, an optical storage medium such as a Compact Disc-ROM (CD-ROM) or a Digital Versatile Disc (DVD), a magnetic-optic medium such as a floptical disc, a Read Only Memory (ROM), a Random Access Memory (RAM), a flash memory, and the like. An example of the program instruction includes not only a machine language created by a compiler but also a high-level language executable by a computer by using an interpreter or the like. When a base station or a relay described in the present disclosure is entirely or partially implemented with a computer program, a computer readable recording medium which stores the computer program is also included in the present disclosure. Therefore, the scope of the disclosure is defined not by the detailed description of the disclosure but by the appended claims, and all differences within the scope will be construed as being included in the present disclosure.

What is claimed is:

1. A method for operating a terminal performing device-to-device (D2D) communication with another terminal, the method comprising:
    determining, from among a plurality of higher priority links, at least one link by using a table information, the table information indicates whether links with a different priority are capable of simultaneously performing D2D communication during a designated period;
    determining, based on a strength of each signal for the at least one link, whether the D2D communication with the another terminal is available during the designated period; and
    transmitting, to the another terminal, a D2D signal, when the D2D communication with the another terminal is available.

2. The method of claim 1, wherein the table information indicates a first link allows that a second link with a lower priority than the first link simultaneously performs D2D communication during the designated period.

3. The method of claim 1, wherein the table information is generated by listening D2D signals caused by the plurality of higher priority links.

4. The method of claim 1, further comprising giving up the D2D communication with the another terminal during the designated period, when the D2D communication with the another terminal is not available.

5. The method of claim 4, further comprising updating the table information by detecting whether the plurality of higher priority links perform D2D communication or not, when the D2D communication with the another terminal is not available.

6. The method of claim 1, further comprising:
    determining whether the table information exists or not; and
    determining, based on strength of signals for the plurality of higher priority links, whether the D2D communication with the another terminal is available during the designated period, when the table information does not exist.

7. The method of claim 1, further comprising receiving, from the another terminal, another D2D signal, when the D2D communication with the another terminal is available.

8. The method of claim 1, determining whether the D2D communication with the another terminal is available during the designated period comprises:
- calculating signal to interference ratio (SIR) for the at least one link based on the strength of each signal for the at least one link; and
- determining, based on the calculated SIR, whether the D2D communication with the another terminal is available during the designated period.

9. The method of claim 8, further comprises:
- if the SIR is greater than or equal to a threshold, transmitting the D2D signal to the another terminal; and
- if the SIR is less than the threshold, giving up the D2D communication with the another terminal during the designated period.

10. An apparatus of a terminal performing device-to-device (D2D) communication with another terminal, the apparatus comprising:
- a controller; and
- a transceiver coupled with the controller; and
- wherein the controller configured to:
  - determine, from among a plurality of higher priority links, at least one link by using a table information, the table information indicates whether links with a different priority are capable of simultaneously performing D2D communication during a designated period,
  - determine, based on a strength of each signal for the at least one link, whether the D2D communication with the another terminal is available during the designated period, and
  - transmit, to the another terminal, a D2D signal when the D2D communication with the another terminal is available.

11. The apparatus of claim 10, wherein the table information indicates a first link allows that a second link with a lower priority than the first link simultaneously performs D2D communication during the designated period.

12. The apparatus of claim 10, wherein the table information is generated by listening D2D signals caused by the plurality of higher priority links.

13. The apparatus of claim 10, wherein the controller is further configured to give up the D2D communication with the another terminal during the designated period, when the D2D communication with the another terminal is not available.

14. The apparatus of claim 13, wherein the controller is further configured to update the table information by detecting whether the plurality of higher priority links perform D2D communication or not, when the D2D communication with the another terminal is not available.

15. The apparatus of claim 10, wherein the controller is further configured to:
- determine whether the table information exists or not, and
- determine, based on strength of signals for the plurality of higher priority links, whether the D2D communication with the another terminal is available during the designated period, when the table information does not exist.

16. The apparatus of claim 10, wherein the controller is further configured to receive, from the another terminal, another D2D signal, when the D2D communication with the another terminal is available.

17. The apparatus of claim 10, wherein the controller is further configured to:
- calculate signal to interference ratio (SIR) for the at least one link based on the strength of each signal for the at least one link; and
- determine, based on the calculated SIR, whether the D2D communication with the another terminal is available during the designated period.

18. The apparatus of claim 17, wherein the controller is further configured to:
- if the SIR is greater than or equal to a threshold, transmit the D2D signal to the another terminal; and
- if the SIR is less than the threshold, give up the D2D communication with the another terminal during the designated period.

* * * * *